(12) United States Patent
Kanazawa

(10) Patent No.: US 11,887,219 B2
(45) Date of Patent: Jan. 30, 2024

(54) SYSTEMS AND METHODS FOR TRAINING AN IMAGE COLORIZATION MODEL

(71) Applicants: Noritsugu Kanazawa, Campbell, CA (US); Google LLC, Mountain View, CA (US)

(72) Inventor: Noritsugu Kanazawa, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 95 days.

(21) Appl. No.: 17/609,573

(22) PCT Filed: May 7, 2019

(86) PCT No.: PCT/US2019/031141
§ 371 (c)(1),
(2) Date: Nov. 8, 2021

(87) PCT Pub. No.: WO2020/226630
PCT Pub. Date: Nov. 12, 2020

(65) Prior Publication Data
US 2022/0254075 A1 Aug. 11, 2022

(51) Int. Cl.
*G06T 11/00* (2006.01)
*G06T 7/90* (2017.01)
(Continued)

(52) U.S. Cl.
CPC .............. *G06T 11/001* (2013.01); *G06T 7/90* (2017.01); *G06V 10/56* (2022.01); *G06V 10/758* (2022.01);
(Continued)

(58) Field of Classification Search
CPC ......... G06T 11/001; G06T 7/90; G06T 7/194; G06T 2207/20084; G06T 2207/20081;
(Continued)

(56) References Cited

U.S. PATENT DOCUMENTS 9,256,950 B1 * 2/2016 Xu ........................... G06F 18/00
2020/0389635 A1 * 12/2020 Afifi ....................... G06V 10/56
(Continued)

OTHER PUBLICATIONS

Domonkos et al., "Fully Automatic Image Colorization Based on Convolutional Neural Network", $3^{rd}$ International Conference on Pattern Recognition, IEEE, Dec. 4, 2016, pp. 3691-3696.
(Continued)

*Primary Examiner* — Wesner Sajous
(74) *Attorney, Agent, or Firm* — Dority & Manning, P.A.

(57) ABSTRACT

A method for training an image colorization model may include inputting a training input image into a colorization model and receive a predicted color map as an output of the colorization model. A first color distance may be calculated between a first pixel of the predicted color map and a second pixel of the predicted color map. A second color distance may be calculated between a third pixel included in a ground truth color map and a fourth pixel included in the ground truth colorization map. The third pixel and fourth pixel included in the ground truth color map may spatially correspond, respectively, with the first pixel and second pixel included in the predicted color map. The method may include adjusting parameters associated with the colorization model based on a neighborhood color loss function that evaluates a difference between the first color distance and the second color distance.

16 Claims, 9 Drawing Sheets

(51) Int. Cl.
| | |
|---|---|
| *G06V 10/56* | (2022.01) |
| *G06V 10/77* | (2022.01) |
| *G06V 10/75* | (2022.01) |
| *G06N 3/04* | (2023.01) |
| *G06N 3/09* | (2023.01) |
| *G06N 3/08* | (2023.01) |
| *H04N 1/60* | (2006.01) |
| *H04N 5/21* | (2006.01) |
| *G09G 5/02* | (2006.01) |
| *H04N 1/58* | (2006.01) |
| *G06V 10/774* | (2022.01) |

(52) U.S. Cl.
CPC ........ *G06V 10/774* (2022.01); *G06V 10/7715* (2022.01)

(58) Field of Classification Search
CPC .. G06T 2207/10024; G09G 5/02; G09G 5/06; G09G 5/04; G09G 5/10; G09G 2320/00; G09G 2320/029; G09G 2320/0266; G09G 2320/0271; G09G 2320/0285; G09G 2320/0295; G09G 2320/06; G09G 2320/0626; G09G 2320/066; G09G 2340/06; G09G 2320/0666; H04N 1/6027; H04N 1/6025; H04N 1/6041; H04N 1/6033; H04N 1/6075; H04N 1/6077; H04N 5/213; H04N 5/57; H04N 9/64; H04N 9/70; G06V 10/56; G06V 10/7715; G06V 10/758; G06V 10/774; G06V 10/82; G06V 40/10; G06N 3/08; G06N 3/045; G06N 3/407; G06N 3/084; G06N 3/044; G06N 3/082; G06F 18/00; G06F 3/048
USPC ........................................................ 382/162
See application file for complete search history.

(56) References Cited

U.S. PATENT DOCUMENTS

| | | | |
|---|---|---|---|
| 2021/0201071 A1* | 7/2021 | Liao | G06F 18/22 |
| 2022/0101021 A1* | 3/2022 | Neubecker | G06T 7/90 |
| 2022/0301227 A1* | 9/2022 | Kanazawa | G06T 11/001 |

OTHER PUBLICATIONS

International Search Report for Application No. PCT/US2019/031141, dated Oct. 8, 2019, 2 pages.
Isola et al., "Image-to-Image Translation with Conditional Adversarial Networks", arxiv.org, Cornell University, Nov. 21, 2016.
Lal et al., "Automatic Image Colorization Using Adversarial Training", Signal Processing Systems, ACM, Nov. 27, 2017, pp. 84-88.
Nazeri et al., "Image Colorization with Generative Adversarial Networks", arxiv.org, Cornell University, Mar. 14, 2018.
Przemyslaw et al., "Digital Image Colorization Based on Probabilistic Distance Transform", International Conference on Computer Analysis of Images and Patterns, CAIP 2017: Computer Analysis of Images and Patterns: Lecture Notes in Computer Science, Sep. 9, 2008, pp. 626-634.
Zhao et al., "Pixel-Level Semantics Guided Image Colorization", arxiv.org, Cornell University, Aug. 5, 2018.

* cited by examiner

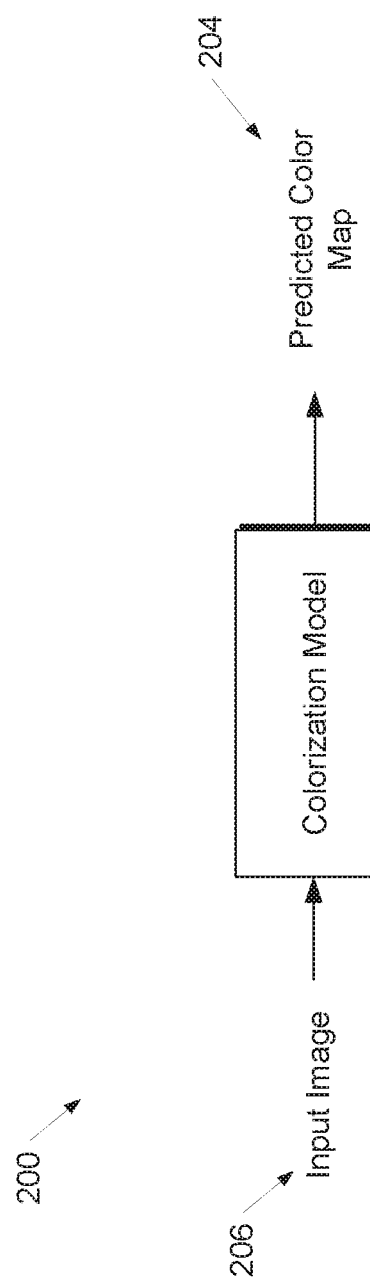

SYSTEMS AND METHODS FOR TRAINING AN IMAGE COLORIZATION MODEL

PRIORITY CLAIM

This application is based upon and claims the right of priority under 35 U.S.C. § 371 to International Application No. PCT/US2019/031141 filed on May 7, 2019. Applicant claims priority to and the benefit of each of such applications and incorporates all such applications herein by reference in their entirety.

FIELD

The present disclosure relates generally to image processing using a machine-learned model and more particularly, the present disclosure relates to systems and methods for training an image colorization model.

BACKGROUND

Generally, previous attempts at colorizing greyscale images have resulted in bland, desaturated colors or involved substantial human interaction or supervision. In particular, certain previous approaches train machine-learned models using an absolute pixel color loss function, which directly compares color values between colorized images and ground truth images. This approach is undesirable as it can penalize the model for generating acceptable, realistic solutions that happen to not match the ground truth image. In other words, absolute pixel color loss functions do not account for the potential of multiple different, but acceptable solutions for a given greyscale image. This hinders the training of models employing such a loss function, resulting in less saturated and vibrant colors in their generated images. In particular, by using a loss function that penalizes differences in absolute color, the model may attempt to "split the difference" for objects that have multiple different possible solutions by providing less saturated and vibrant colors. For example, if a training set includes multiple images of apples, including some images where the apples are red and some where the apples are green, the model may learn to provide a neutral color for the apples to minimize the overall loss across the training set. Furthermore, the predicted neutral color may not accurately reflect the possible ground truth colors of the apples. Accordingly, a better method for training a colorization model would be welcomed in the art.

SUMMARY

Aspects and advantages of embodiments of the present disclosure will be set forth in part in the following description, or can be learned from the description, or can be learned through practice of the embodiments.

One example aspect of the present disclosure is directed to a method for training an image colorization model. The method may include inputting, by one or more computing devices, a training input image into a colorization model configured to receive the training input image and process the training input image to output a predicted color map that describes a predicted colorization for the training input image. The method may include receiving, by the one or more computing devices, the predicted color map as an output of the colorization model. The method may include calculating, by the one or more computing devices, a first color distance between a first pixel included in the predicted color map and a second pixel included in the predicted color map. The method may include calculating, by the one or more computing devices, a second color distance between a third pixel included in a ground truth color map and a fourth pixel included in the ground truth colorization map. The third pixel and fourth pixel included in the ground truth color map spatially correspond, respectively, with the first pixel and second pixel included in the predicted color map. The method may include evaluating, by the one or more computing devices, a neighborhood color loss function that evaluates a difference between the first color distance and the second color distance. The method may include adjusting, by the one or more computing devices, parameters associated with the colorization model based on the neighborhood color loss function.

Another example aspect of the present disclosure is directed to a computing system including a colorization model configured to receive a training input image and, in response to receiving the training input image, output a predicted color map that describes a predicted colorization for the training input image. The computing system may include one or more processors and one or more non-transitory computer-readable media that collectively store instructions that, when executed by the one or more processors, cause the computing system to perform operations. The operations may include inputting the training input image into the colorization model; receiving the predicted color map as an output of the colorization model; calculating a first color distance between a first pixel included in the predicted color map and a second pixel included in the predicted color map; calculating a second color distance between a third pixel included in a ground truth color map and a fourth pixel included in the ground truth colorization map. The third pixel and fourth pixels included in the ground truth color map may spatially correspond, respectively, with the first pixel and second pixel included in the predicted color map. The operations may include evaluating a neighborhood color loss function that evaluates a difference between the first color distance and the second color distance and adjusting parameters associated with the colorization model based on the neighborhood color loss function.

Another example aspect of the present disclosure is directed to a computing system including a colorization model configured to receive an input image and, in response to receiving the input image, output a predicted color map that describes a predicted colorization for the input image. The colorization model may have been trained based on a neighborhood color loss function that evaluates a difference between a first color distance and a second color distance. The first color distance may have been calculated between a first pixel included in a training predicted color map output by the colorization model during training and a second pixel included in the training predicted color map. The second color distance may be between a third pixel included in a ground truth color map and a fourth pixel of the ground truth color map. The third pixel and fourth pixel included in the ground truth color map may spatially correspond, respectively, with the first pixel and second pixel included in the training predicted color map. The computing system may include one or more processors and one or more non-transitory computer-readable media that collectively store instructions that, when executed by the one or more processors, cause the computing system to perform operations. The operations may include inputting the input image into the colorization model; receiving the predicted color map as an output of the colorization model; and generating an output image based on the input image and the predicted color map.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Example drawings are attached. A brief description of the drawings is provided below:

FIG. 2 depicts a colorization model configured to generate a predicted color map based on an input image according to example embodiments of the present disclosure.

Figure 1A:
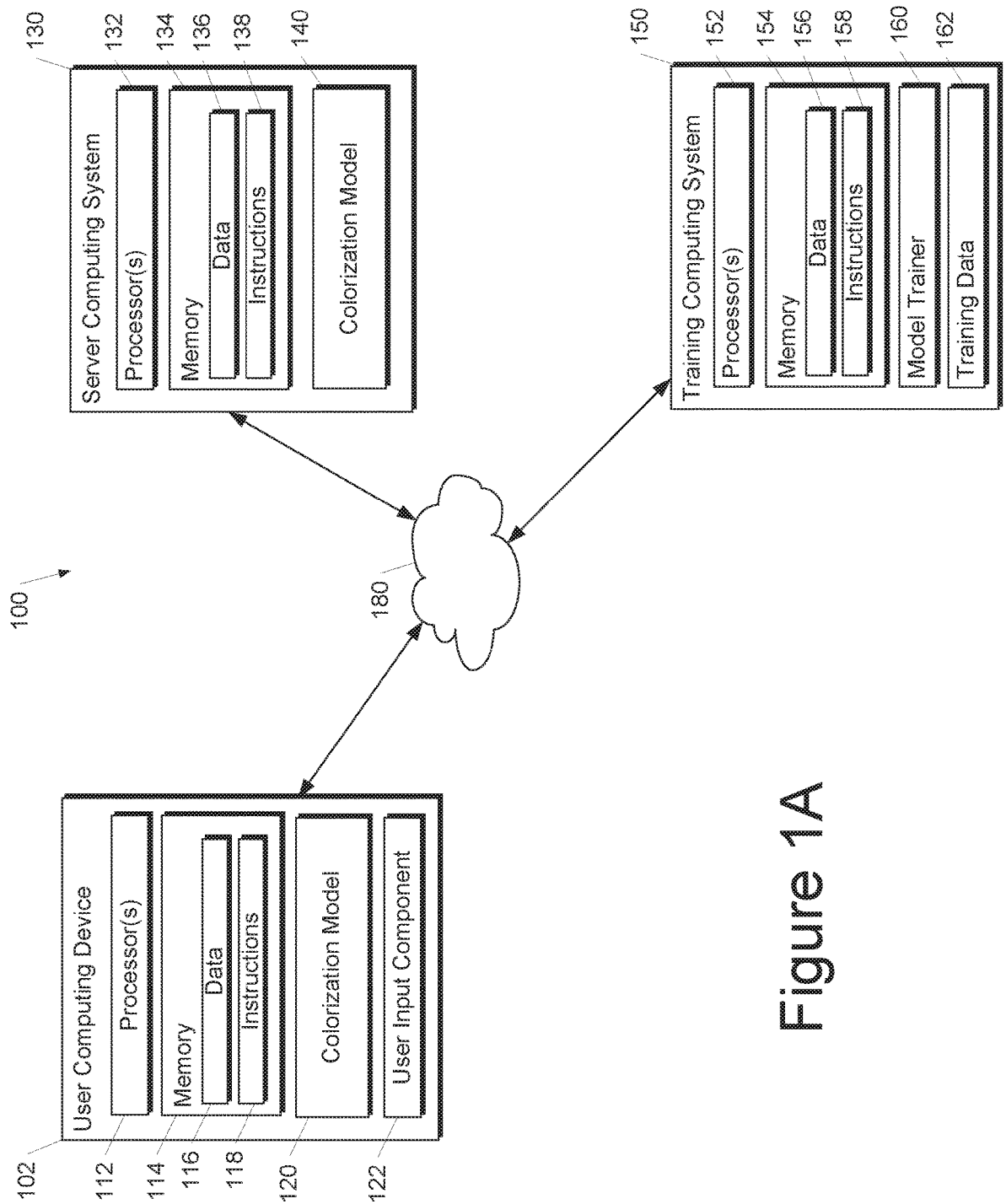
FIG. 1A depicts a block diagram of an example computing system for training an image colorization model according to example embodiments of the present disclosure.

Reference numerals that are repeated across plural figures are intended to identify the same features in various implementations.

DETAILED DESCRIPTION

Overview

Generally, the present disclosure is directed to systems and methods for colorizing greyscale images, and more particularly to systems and methods for training a colorization model. In particular, aspects of the present disclosure are directed to training a colorization model using a neighborhood color loss function. The neighborhood color loss function can reward the colorization loss model for predicting pixel color values that are the correct magnitude of distance from the respective color values of some or all of the other pixels of the image, rather than focusing on whether the colorization model has correctly predicted the actual ground truth color values themselves. In such fashion, the colorization model can be enabled to produce vivid colors for objects that may have multiple correct re-colorization solutions.

More particularly, some objects (e.g., vehicles, flowers, etc.) can be a variety of colors. Greyscale images provide no indication of the original color of those objects. As such, colorizing greyscale images is not a deterministic solution because multiple acceptable or "correct" solutions can exist for a single input image. Penalizing colorization models for colorizing such objects with colors that differ from the ground truth image is not productive and can result in bland, desaturated results. For instance, it can be counterproductive to penalize a colorization model for predicting that a vehicle in a greyscale image is red when the vehicle in the ground truth image was blue. Accordingly, to better train colorization models, a neighborhood color loss function can be employed that avoids penalizing (or at least counterbalances the influence of penalties for) acceptable colorization solutions that differ from the ground truth colorization. As such, colorization models using a neighborhood color loss function can result in colorized images that are more saturated and vivid.

The neighborhood color loss function can be calculated as a difference between a relative first color distance for the predicted image and a second color distance for the ground truth image. More particularly, a first color distance can be calculated between first and second pixels included in a predicted color map output by the colorization model for a training input image. A second color distance can be calculated between third and fourth pixels included in a ground truth color map corresponding to a ground truth image. The third and fourth pixels in the ground truth color map spatially correspond, respectively, with the first and second pixels in the predicted color map. The neighborhood color loss function can evaluate a difference between the first color distance and the second color distance. Parameters (e.g., weights) associated with the colorization model can be adjusted based on the neighborhood color loss function.

The neighborhood color loss function can be calculated for some or all of the pixels of the predicted color map. It should be understood that the neighborhood color loss function can be iteratively calculated for multiple "first pixels." For example, neighborhood color loss function can be calculated for each pixel of the predicted color map.

The first pixel of the predicted color map can be selected using a variety of suitable techniques. The first pixel(s) can be randomly selected within the predicted color map (e.g., anywhere within the predicted color map or bounded within certain portions of the predicted color map, such as within identified features or objects). The first pixel(s) can be selected based on location within the color map, such as according to a shape or pattern (e.g., grid, square, circle, etc.). The first pixel(s) can be selected based on objects or features detected within the training input image. Some or all pixels of one or more detected features can be iteratively selected as the first pixel.

The neighborhood color loss function can be calculated for a plurality of second pixels of the predicted color map. The second pixels can be selected using a variety of suitable techniques, including random or systematic selection. For example, the second pixel can be iteratively selected as each pixel of the predicted color map (other than the first pixel) such that a "neighborhood color loss map" is generated for the first pixel with respect to the rest of the predicted color map. Alternatively, the second pixels can be selected based on relative location with respect to the first pixel. For example, one or more pixels directly adjacent the first pixel can be selected as the second pixel(s). As another example, one or more pixels can be selected that are spaced apart from the first pixel by a set distance or arranged relative to the first pixel in a pattern (e.g., circle, square, grid, etc.).

In some implementations, the colorization model can employ multinomial classification to generate the predicted color map. More specifically, the colorization model can include a multinomial prediction model and a refinement model. The multinomial prediction model can be configured to receive the training input image and output a multinomial color distribution that describes a plurality of colorizations for the training input image in a color space, such as a discretized color space. The discretized color space can include a plurality of color bins (e.g., n×n color bins) defined within a color space (e.g., the CIELAB color space). For instance, the color bins can be selected to encompass or include colors that are displayable on a display screen, such as in-gamut colors in an RGB color space. The size of the color bins can be selected considering the desired color resolution in the discretized color space and/or the desired simplicity of (e.g., reduced computing resources required for) training the colorization model. For instance, the color space can be discretized into 10×10 color bins resulting in about 310 discrete, in-gamut colors (e.g., ab pairs in the CIELAB color space).

The multinomial prediction model can include an encoder model and a decoder model in an autoencoder configuration. The training input image can be input into the encoder, and the multinomial distribution can be received as an output of the decoder model. The multinomial prediction model can include at least one skip connection between a layer of the encoder model and a layer of the decoder model. Such skip connections can pass useful information from hidden layers of the encoder model to layers of the decoder model. This can facilitate back propagation during training of the multinomial prediction model.

The refinement model can be configured to receive the multinomial color distribution and output the predicted color map. The output image can be generated based on the predicted color map and the training input image (e.g., a brightness map describing the brightness of the training input image). As indicated above, the multinomial color distribution can describe a plurality of colorizations for the training input image. For instance, the multinomial color distribution can include respective color distributions for each pixel of the training input image. The refinement model can be configured to combine two or more colorizations of the plurality of colorizations of the multinomial color distribution. Parameters of the refinement model can be adjusted based on the neighborhood color loss function such that the refinement model is trained to output predicted color maps that minimize the neighborhood color loss function.

In some implementations, the colorization model can be trained using one or more additional loss functions. The additional loss functions can be defined relative to the predicted color map, multinomial color distribution, and/or a ground truth color map for the training input image. For example, a total loss function can be defined that includes the neighborhood color loss function and one or more of the additional loss functions. As an example, an absolute color loss function can be employed that evaluates a difference (e.g., color distance) between the predicted color map and a ground truth color map.

As another example, a refinement softmax loss function can be employed that evaluates a difference between the multinomial color distribution and the predicted color map. The multinomial color distribution and predicted color map may be encoded in different color spaces. For example, the multinomial color distribution can be encoded in the discretized color space, but the predicted color map may not necessarily be encoded in the discretized color space. Thus, to compare the predicted color map and multinomial distribution, the method can include encoding the predicted color map into the discretized color space (e.g., into the plurality of color bins) to generate a discretized predicted color map. Thus, the refinement softmax loss function can describe a difference between the multinomial color distribution and the discretized predicted color map in the discretized color space.

Encoding the predicted color map in the discretized color space can be achieved in a variety of manners. For example, the predicted color map can be "one hot" encoded in the discretized color space. Such encoding can include selecting a single color bin (e.g., the "closest" color bin) of the discretized color space for each pixel of the predicted color map. As another example, the predicted color map can be soft encoded in the discretized color space. Soft encoding can include representing each pixel of as a distribution of two or more of color bins of the discretized color space.

As another example, the parameters of the multinomial prediction model can be adjusted based on a multinomial softmax loss function. The multinomial softmax loss function can evaluate a difference between the ground truth color map and the multinomial color distribution output by the multinomial prediction model. However, the ground truth color map and multinomial color distribution may be encoded in different color spaces. As such, the method may include discretizing a color space associated with the ground truth color map to generate a discretized color space comprising a plurality of color bins. The ground truth color map may be encoded into the discretized color space to generate a discretized ground truth color map. The multinomial softmax loss function can describe a difference between the discretized ground truth color map and the multinomial color distribution.

In some implementations, the colorization model can be trained as part of Generative Adversarial Network (GAN). For example, a discriminator model can be configured to receive an output of the colorization model (e.g., the predicted color map and/or the colorized image). In response to receiving the output of the colorization model, the discriminator model can output a discriminator loss that evaluates a score with respect to the output of the colorization model as compared with the ground truth image. For instance, the discriminator loss can include a binary score that indicates whether the discriminator model identified the predicted color map or output image as being or corresponding with a ground truth image ("True") or as a colorized image ("False"). However, in some implementations, instead of a binary score, the discriminator loss can include a probabilistic distribution, or confidence score, with respect to the above identifications.

The discriminator model can be trained to better recognize ground truth images and discriminate between ground truth images and colorized images. During such training, a mix of ground truth images and predicted images can be input into the discriminator model. The discriminator model can be trained based on a loss function that penalizes the model for incorrectly identifying the predicted images.

The training of the discriminator model can be performed in alternation with training of the colorization model. For example, a first training stage can include training the colorization model, and a second training stage can include training the discriminator model. The first and second training stages can be alternated for a total number of training iterations or until one or more performance criteria are satisfied for the discriminator and/or colorization model. One example criteria for the colorization model is a threshold percentage of predicted color maps that "fool" the discriminator model. An example criterion for the discriminator model is correctly identifying a threshold percentage of color maps input into the discriminator as predicted color maps or ground truth color maps.

During training of the colorization model, the predicted color map can be input into the discriminator model and a discriminator loss can be received as an output of the discriminator model. Like the discriminator loss, the discriminator loss can include a binary indicator or a distribution that describes whether the discriminator model's categorization of the predicted color map input into the discriminator model as a predicted colorization or a ground truth image. The colorization model can be trained based on the discriminator loss to produce predicted color maps that "fool" the discriminator model such that the discriminator model classifies the predicted color map as a ground truth image.

In some implementations, the colorization model can leverage object or feature detection or recognition to improve training of the colorization model. For example, the colorization model can include a feature detection model that is configured to receive the training input image as an input and output a plurality of feature representations that describe locations of objects or features within the training input image. The feature detection model can be separate from the multinomial prediction model and/or included with the multinomial prediction model. The feature representations can include bounding objects (e.g., boxes, points, pixel masks, etc.) that describe locations of one or more features or objects recognized or detected within the training input image.

In some embodiments, the feature representations can include labels (e.g., categories) of identified objects. The feature representations can be input into the refinement model and/or the multinomial prediction model such that semantic relationships between objects and colors can be learned. For example, it can be learned that octagonal signs are often red stop signs. However, in other embodiments, the feature representations can be free of such labels. In such embodiments, the feature representations can simply identify boundaries between various shapes or features depicted in the training input image.

Various transformations or encodings can be performed by the colorization model, discriminator model, and/or performed to inputs and/or outputs thereof. The input image and/or output image can be in the RGB color space. As described above, the colorization model can generally operate in the CIELAB color space. Furthermore, in some embodiments the discriminator model can operate in the RGB color space. Thus, transformations between the RGB color space and the CIELAB color space can be performed as needed. Generally, however, the various models and inputs/outputs described herein can operate or be represented in any number of different color spaces, including RGB, CIELAB, HSV, HSL, CMYK, etc.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., an image colorization service).

The systems and methods of the present disclosure provide a number of technical effects and benefits. For example, implementations described herein can provide more perceptually realistic colorizations than prior art systems and methods. The colorizations may be substantially indistinguishable from a ground truth image for a computer implemented image discriminator model that is configured to classify images as "real" or "fake." Additionally, the systems and methods described herein may require less human supervision and/or manual input than prior art methods. Furthermore, models trained based on aspects of the present disclosure may replace multiple prior art machine-learned models or more complex prior art machine-learned models. As such, the aspects of the present disclosure may result in machine-learned models that consume less computing resources than prior art models.

With reference now to the Figures, example embodiments of the present disclosure will be discussed in further detail.

Example Devices and Systems

FIG. 1A depicts a block diagram of an example computing system 100 for training an image colorization model according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more colorization models 120. For example, the colorization model(s) 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example colorization models 120 are discussed with reference to FIGS. 2 through 5.

In some implementations, the one or more colorization models 120 can be received from the server computing system 130 over network 180, stored in the user computing device memory 114, and the used or otherwise implemented by the one or more processors 112. In some implementations, the user computing device 102 can implement multiple parallel instances of a single colorization model 120 (e.g., to perform parallel colorization operations across multiple instances of the colorization model 120).

More particularly, the colorization model 120 can be configured to colorize greyscale images, such as old photographs. In particular, aspects of the present disclosure are directed to training a colorization model using a neighborhood color loss function. The neighborhood color loss function can reward the colorization loss model for predicting pixel color values that are the correct magnitude of distance from the respective color values of some or all of the other pixels of the image, rather than focusing on whether the colorization model has correctly predicted the actual ground truth color values themselves. In such fashion, the colorization model can be enabled to produce vivid colors for objects that may have multiple correct re-colorization solutions.

Additionally or alternatively, one or more colorization models 140 can be included in or otherwise stored and implemented by the server computing system 130 that communicates with the user computing device 102 according to a client-server relationship. For example, the colorization models 140 can be implemented by the server computing system 140 as a portion of a web service (e.g., an image colorization and/or storage service which may, for example, be offered as a feature of a photograph storage application). Thus, one or more colorization models 120 can be stored and implemented at the user computing device 102 and/or one or more colorization models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned colorization models 140. For example, the models 140 can be or can otherwise include various machine-learned models such as neural networks (e.g., deep recurrent neural networks) or other multi-layer non-linear models. Example models 140 are discussed with reference to FIGS. 2 through 5.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a colorization model 140 based on a set of training data 142. The training data 142 can include, for example, ground truth images and training input images including greyscale versions of the ground truth images.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
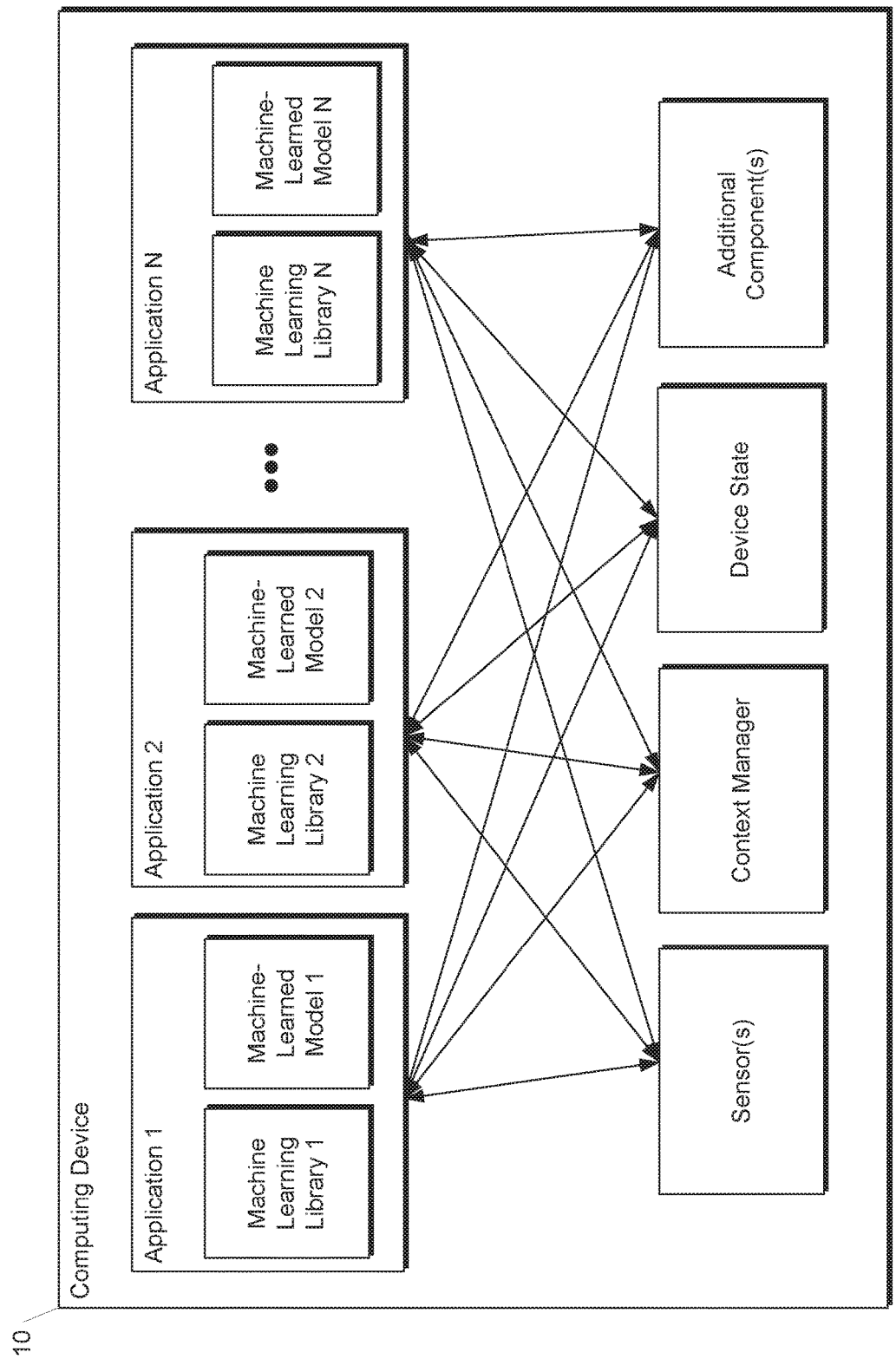
FIG. 1B depicts a block diagram an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
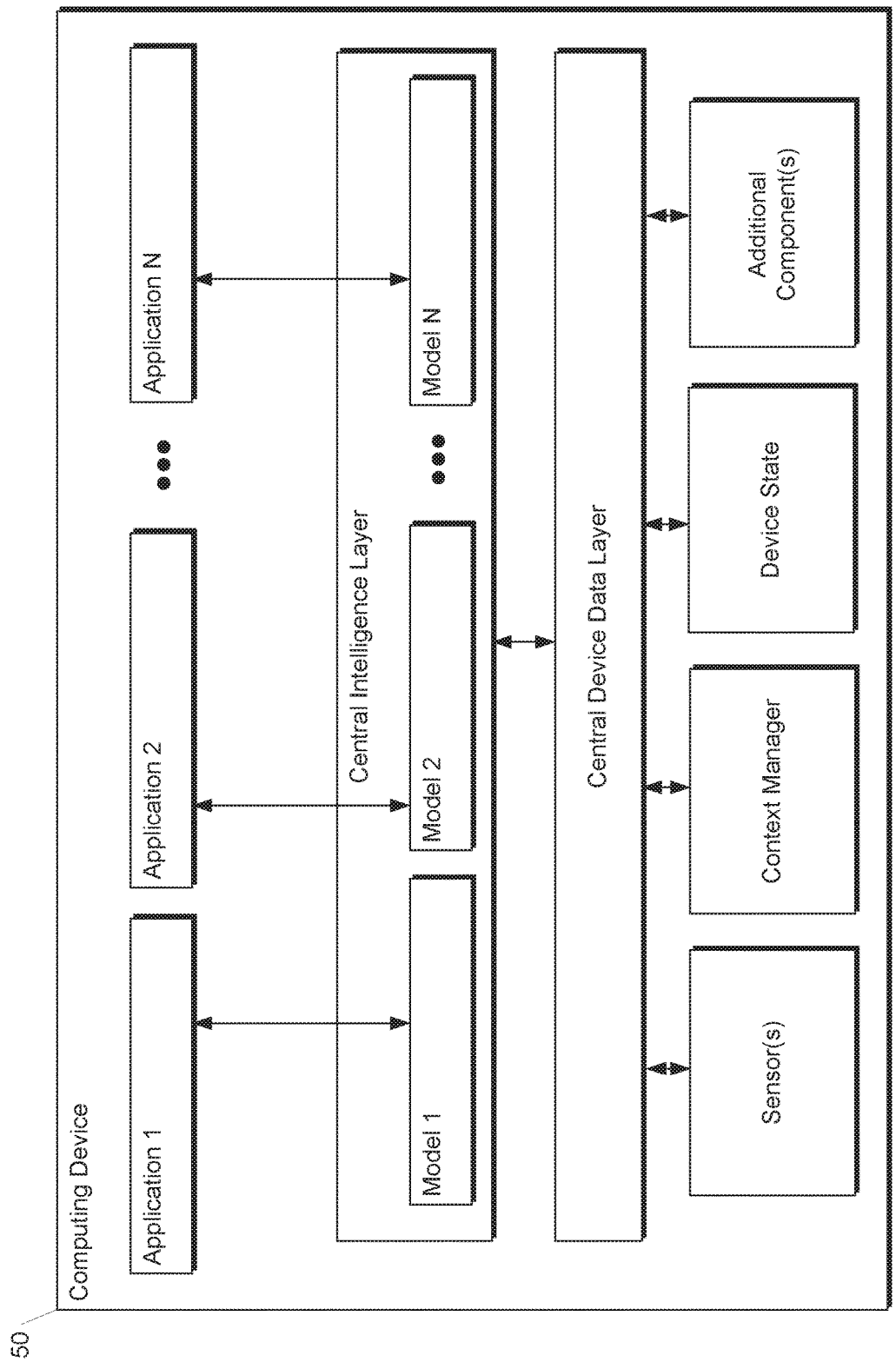
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

FIG. 2 depicts a block diagram of an example colorization model 200 according to example embodiments of the present disclosure. In some implementations, the colorization model 200 is trained to receive an input image 206 and process the input image 206 to output a predicted color map 204 that describes a predicted colorization for the input image 206.

Figure 3A:
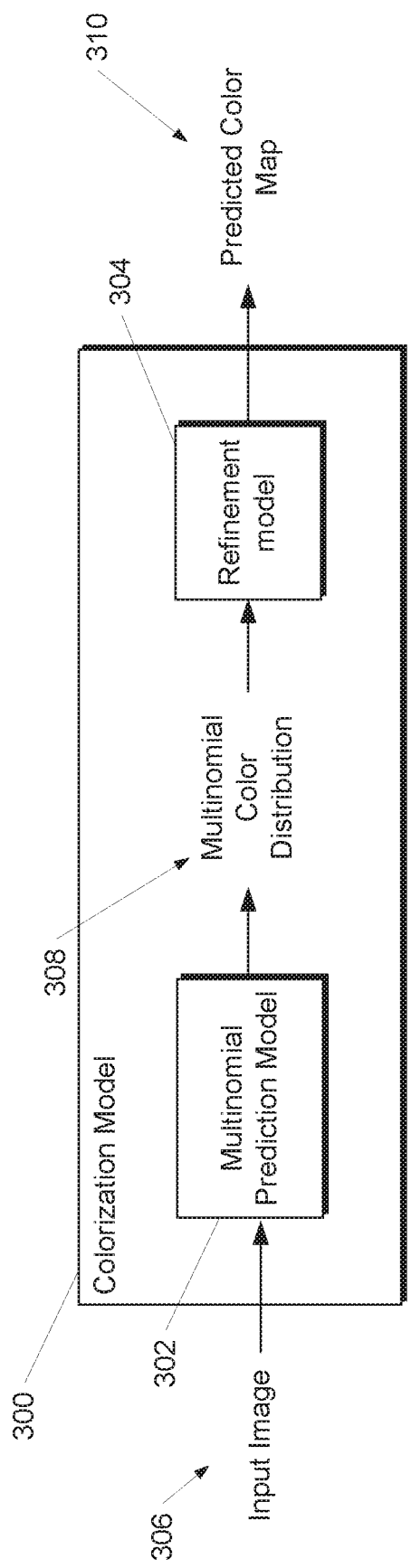
FIG. 3A depicts a colorization model including a multinomial prediction model and a refinement model according to example embodiments of the present disclosure.

FIG. 3A depicts a block diagram of an example colorization model 300 according to example embodiments of the present disclosure. In some implementations, the colorization model 300 can include a multinomial prediction model 302 and a refinement model 304. The multinomial prediction model 302 can be configured to receive a training input image 306, and in response to receiving the training input image 306, output a multinomial color distribution 308. The multinomial color distribution 308 can describe a plurality of colorizations for the training input image 306 (e.g., in a discretized color space). The refinement model 304 can be configured to receive the multinomial color distribution 308, and in response to receiving the multinomial color distribution 308, output the predicted color map 310.

Figure 3B:
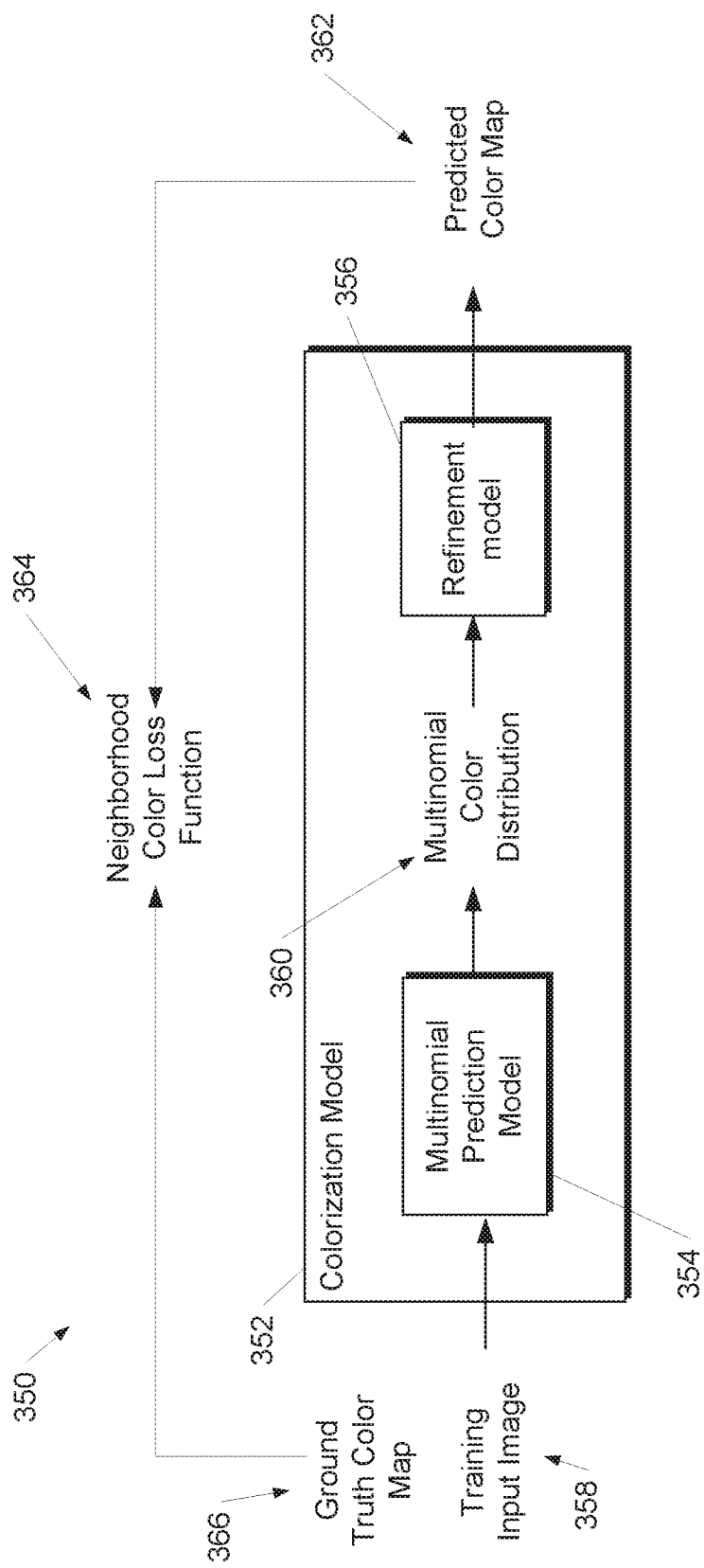
FIG. 3B depicts an example system for training a colorization model based on a neighborhood color loss function according to example embodiments of the present disclosure.

FIG. 3B depicts a block diagram of an example system 350 for training a colorization model 352 according to example embodiments of the present disclosure. As discussed above, the colorization model 352 can include a multinomial prediction model 354 and a refinement model 356. The multinomial prediction model 354 can be configured to receive a training input image 358, and in response to receiving the training input image 358, output a multinomial color distribution 360. The multinomial color distribution 360 can describe a plurality of colorizations for the training input image 358 (e.g., in a discretized color space). The discretized color space can include a plurality of color bins (e.g., n×n color bins) defined within a color space (e.g., the CIELAB color space). For instance, the color bins can be selected to encompass or include colors that are displayable on a display screen, such as in-gamut colors in an RGB color space. The size of the color bins can be selected considering the desired color resolution in the discretized color space and/or the desired simplicity of (e.g., reduced computing resources required for) training the colorization model. For instance, the color space can be discretized into 10×10 color bins resulting in about 310 discrete, in-gamut colors (e.g., ab pairs in the CIELAB color space).

The multinomial prediction model 354 can include an encoder model and a decoder model in an autoencoder configuration. The training input image 358 can be input into the encoder, and the multinomial distribution 360 can be received as an output of the decoder model. The multinomial prediction model 354 can include at least one skip connection between a layer of the encoder model and a layer of the decoder model (e.g., as a ladder model). Such skip connections can pass useful information from hidden layers of the encoder model to layers of the decoder model. This can facilitate back propagation during training of the multinomial prediction model 354.

The refinement model 356 can be configured to receive the multinomial color distribution 360. In response to receiving the multinomial color distribution 360, the refinement model 356 can be configured to output a predicted color map 362.

The colorization model 352 can be trained using a neighborhood color loss function 364. Generally, the neighborhood color loss function 364 be configured to avoid penalizing (or at least reduce the influence of penalties for) acceptable predicted color maps 362 for the training input image 358 that differ from a ground truth color map 366.

More specifically, the neighborhood color loss function 364 can be calculated as a difference between a relative first color distance for the predicted color map 362 and a second color distance for the ground truth color map 366. More particularly, a first color distance can be calculated between first and second pixels included in the predicted color map 362. A second color distance can be calculated between third and fourth pixels included in the ground truth color map 366 corresponding to a ground truth image. The third and fourth pixels in the ground truth color map 366 may spatially correspond, respectively, with the first and second pixels in the predicted color map 362. The neighborhood color loss function 364 can evaluate a difference between the first color distance and the second color distance. Parameters (e.g., weights) associated with the colorization model 352 can be adjusted based on the neighborhood color loss function 364.

The neighborhood color loss function 364 can be calculated for some or all of the pixels of the predicted color map 362. It should be understood that the neighborhood color loss function 364 can be iteratively calculated for multiple "first pixels." For example, neighborhood color loss function 364 can be calculated for each pixel of the predicted color map 362.

The first pixel of the predicted color map 362 can be selected using a variety of suitable techniques. The first pixel(s) can be randomly selected within the predicted color map 362 (e.g., anywhere within the predicted color map or bounded within certain portions of the predicted color map, such as within identified features or objects). The first pixel(s) can be selected based on location within the predicted color map 362, such as according to a shape or pattern (e.g., grid, square, circle, etc.). The first pixel(s) can be selected based on objects or features detected within the ground truth color map 366. Some or all pixels of one or more detected features can be iteratively selected as the first pixel.

The neighborhood color loss function 364 can be calculated for a plurality of second pixels of the predicted color map 362. The second pixels can be selected using a variety of suitable techniques, including random or systematic selection. For example, the second pixel can be iteratively selected as each pixel of the predicted color map 362 (other than the first pixel) such that a "neighborhood color loss map" is generated for the first pixel with respect to the rest of the predicted color map 362. Alternatively, the second pixels can be selected based on relative location with respect to the first pixel. For example, one or more pixels that are directly adjacent the first pixel can be selected as the second pixel(s). As another example, one or more pixels can be selected that are spaced apart from the first pixel by a set distance or arranged relative to the first pixel in a pattern (e.g., circle, square, grid, etc.).

As indicated above, the refinement model 356 can be configured to receive the multinomial color distribution 360 and output the predicted color map 362. An output image can be generated based on the predicted color map 362 and the training input image 358 (e.g., a brightness map describing the brightness of the training input image 358). As indicated above, the multinomial color distribution 360 can describe a plurality of colorizations for the training input image 358. For instance, the multinomial color distribution 360 can include respective color distributions for each pixel of the training input image 358. The refinement model 356 can be configured to combine two or more colorizations of the plurality of colorizations of the multinomial color distribution 360. Parameters (e.g., weights) of the refinement model 356 can be adjusted based on the neighborhood color loss function 364 such that the refinement model 356 is trained to output predicted color maps 362 that minimize the neighborhood color loss function 364.

Figure 4:
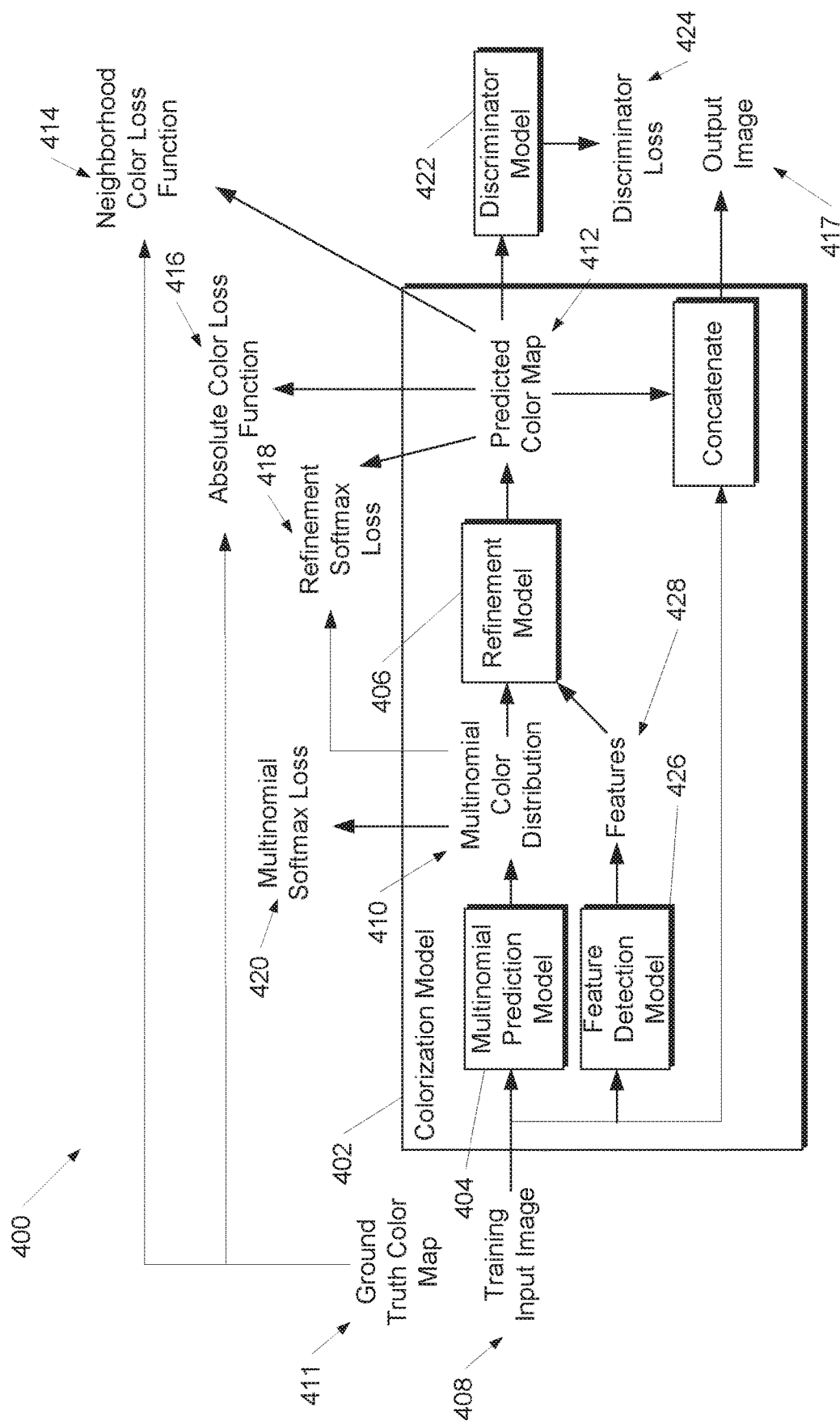
FIG. 4 depicts a training configuration for a colorization model including a multinomial prediction model and a refinement mode based on a neighborhood color loss function and additional loss functions according to example embodiments of the present disclosure.

FIG. 4 depicts a block diagram of an example system 400 for training a colorization model 402 according to example embodiments of the present disclosure. As discussed above, the colorization model 402 can include a multinomial prediction model 404 and a refinement model 406. The multinomial prediction model 404 can be configured to receive a training input image 408, and in response to receiving the training input image 408, output a multinomial color distribution 410. The multinomial color distribution 404 can describe a plurality of colorizations for the training input image 408 (e.g., in a discretized color space). The refinement model 406 can be configured to receive the multinomial color distribution 410 and output the predicted color map 412. The colorization model 402 may be trained using a neighborhood color loss function 414, for example as described above with respect to the neighborhood color loss function 364 of FIG. 3.

In some implementations, the colorization model 402 can be trained using one or more additional loss functions. The additional loss functions can be defined relative to the predicted color map 412, multinomial color distribution 410, and/or the ground truth color map 411 for the training input image 408. For example, a total loss function can be defined that includes the neighborhood color loss function 414 and one or more of the additional loss functions. As an example, an absolute color loss function 416 can be employed that describes a difference (e.g., color distance) between the predicted color map 412 and the ground truth color map 411.

As another example of another additional loss function, a refinement softmax loss function 418 can be employed that describes a difference between the multinomial color distribution 410 and the predicted color map 412. The multinomial color distribution 410 and predicted color map 412 may be encoded in different color spaces. For example, the multinomial color distribution 410 can be encoded in the discretized color space. To compare the predicted color map 412 and multinomial distribution 410, the predicted color map 412 can be encoded into the discretized color space (e.g., into the plurality of color bins) to generate a discretized predicted color map. Thus, the refinement softmax loss function 418 can describe a difference between the multinomial color distribution 410 and the discretized predicted color map in the discretized color space. However, it should be understood that the predicted color map 412 is not necessarily encoded in the discretized color space.

Encoding the predicted color map 412 in the discretized color space can be achieved in a variety of manners. For example, the predicted color map 412 can be "one hot" encoded in the discretized color space. Such encoding can include selecting a single color bin (e.g., the "closest" color bin) of the discretized color space for each pixel of the predicted color map 412. As another example, the predicted color map 412 can be soft encoded in the discretized color space. Soft encoding can include representing each pixel of as a distribution of two or more of color bins of the discretized color space.

As another example of another additional loss function, the parameters of the multinomial prediction model 404 can be adjusted based on a multinomial softmax loss function 420. The multinomial softmax loss function 420 can describe a difference between the ground truth color map 411 and the multinomial color distribution 410 output by the multinomial prediction model 404. However, the ground truth color map 411 and multinomial color distribution 410 may be encoded in different color spaces. As such, the color space associated with the ground truth color map 411 may be discretized to generate a discretized color space comprising a plurality of color bins. The ground truth color map 411 may be encoded into the discretized color space to generate a discretized ground truth color map. The multinomial softmax loss function 420 can describe a difference between the discretized ground truth color map and the multinomial color distribution 410.

In some implementations, the colorization model 402 can be trained as part of Generative Adversarial Network (GAN). For example, a discriminator model 422 can be configured to receive an output of the colorization model 402 (e.g., the predicted color map 412 and/or the output image 417). In response to receiving the output of the colorization model 402, the discriminator model 422 can output a discriminator loss 424 that describes a score with respect to the output of the colorization model 402 as compared with the ground truth image. The discriminator loss 424 can describe a score with respect to the predicted color map 412 as compared with the ground truth color map 411.

For instance, the discriminator loss 424 can include a binary score that indicates whether the discriminator model 422 identified the predicted color map 412 as a ground truth color map 411 ("True") or as a predicted color map 412 ("False"). In other embodiments, instead of a binary score, the discriminator loss 424 can include a probabilistic distribution, or confidence score, with respect to the above identifications.

Figure 5:
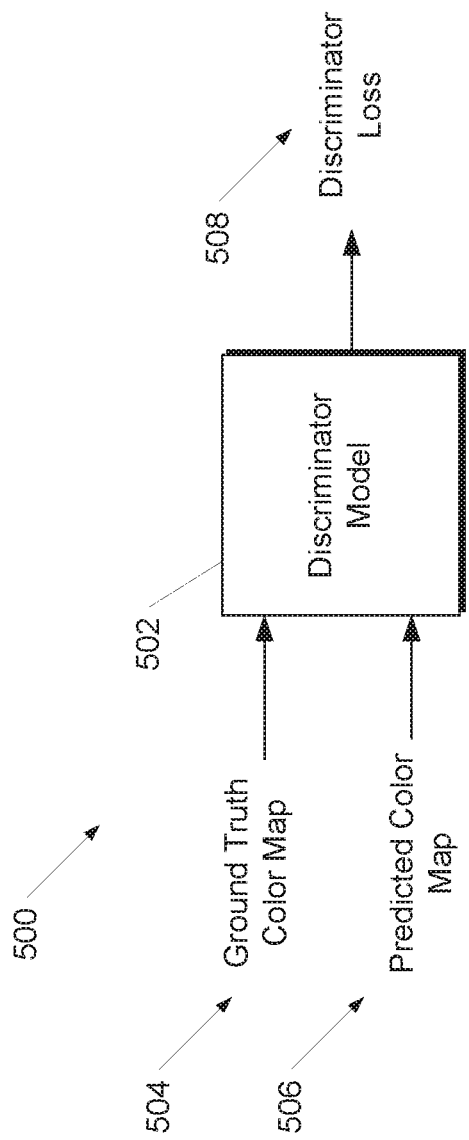
FIG. 5 depicts a training configuration for a discriminator model according to example embodiments of the present disclosure.

FIG. 5 illustrates a training configuration 500 for a discriminator model 502 according to aspects of the present disclosure. The discriminator model 502 can be trained to better recognize ground truth images and discriminate between ground truth images and colorized images. During such training, a mix of ground truth images (or ground truth color maps 504) and predicted images (or predicted color maps 506) can be input into the discriminator model 502. The discriminator model 502 can output a discriminator loss 508 in response to receiving the ground truth color map 504 or the predicted color map 506. The discriminator model 502 can be trained based on a loss function that penalizes the model for incorrectly identifying the input image or color map 504, 506.

The training of the discriminator model 502 (e.g., as described with reference to FIG. 5), can be performed in alternation with training of the colorization model 402 (e.g., as described with reference to FIG. 4). A first training stage can include training the colorization model 402 as described with reference to FIG. 4. A second training stage can include training the discriminator model 422, 502 as described with reference to FIG. 5. The first and second training stages can be alternated until training of the discriminator model 502 is completed. For example, the discriminator model 502 can be trained for a total number of training iterations or until one or more performance criteria are satisfied for the discriminator model 502 and/or colorization model 402 (FIG. 4). One example criteria for the colorization model is a threshold percentage of predicted color maps that "fool" the discriminator model 502. An example criterion for the discriminator model 502 is correctly identifying a threshold percentage of color maps input into the discriminator model 502 as predicted color maps 506 or ground truth color maps 504.

During training of the colorization model 402, the predicted color map 412 can be input into the discriminator model 422. The discriminator loss 422 can be received as an output of the discriminator model 422. As noted above, the discriminator loss 422 can include a binary indicator or a distribution that describes whether the categorization by the discriminator 422 of the predicted color map 412 input into the discriminator model 422 as a predicted colorization or a ground truth image. The colorization model 402 can be trained based on the discriminator loss 424 to produce predicted color maps 412 that "fool" the discriminator model 422 such that the discriminator model 422 classifies the predicted color map 412 as a ground truth color map 411 and/or as corresponding with a ground truth image (instead of identifying the predicted color map 412 as a generated colorization).

In some implementations, the colorization model 402 can leverage object or feature detection or recognition to improve training of the colorization model 402. For example, the colorization model 402 can include a feature detection model 426 that is configured to receive the training input image 408 as an input and output a plurality of feature representations or features 428 that describe locations of objects or features within the training input image 408. The feature detection model can be separate from the multinomial prediction model 404 and/or included in the multinomial prediction model 404. The feature representations 428 can include bounding objects (e.g., boxes, points, pixel masks, etc.) that describe locations of one or more features or objects recognized or detected within the training input image 408.

In some embodiments, the feature representations 428 can include labels (e.g., categories) of identified objects. The feature representations 428 can be input into the refinement model 406 and/or the multinomial prediction model 404 such that semantic relationships between objects and colors can be learned. For instance, it can be learned that octagonal signs are often red stop signs. However, in other embodiments, the feature representations 428 can be free of such labels. In such embodiments, the feature representations 428 can simply identify bounding objects (e.g., boxes, points, pixel masks, etc.) or locations of various shapes or features depicted in the training input image 408.

Various transformations or encodings can be performed by the colorization model 402, the discriminator model 422, and/or performed to inputs and/or outputs thereof. The input image 408 and/or output image 417 can be in the RGB color space. As described above, the colorization model 402 can generally operate in the CIELAB color space. Furthermore, in some embodiments the discriminator model 422 can operate in the RGB color space. Thus, transformations between the RGB color space and the CIELAB color space can be performed as needed.

Example Methods

Figure 6:
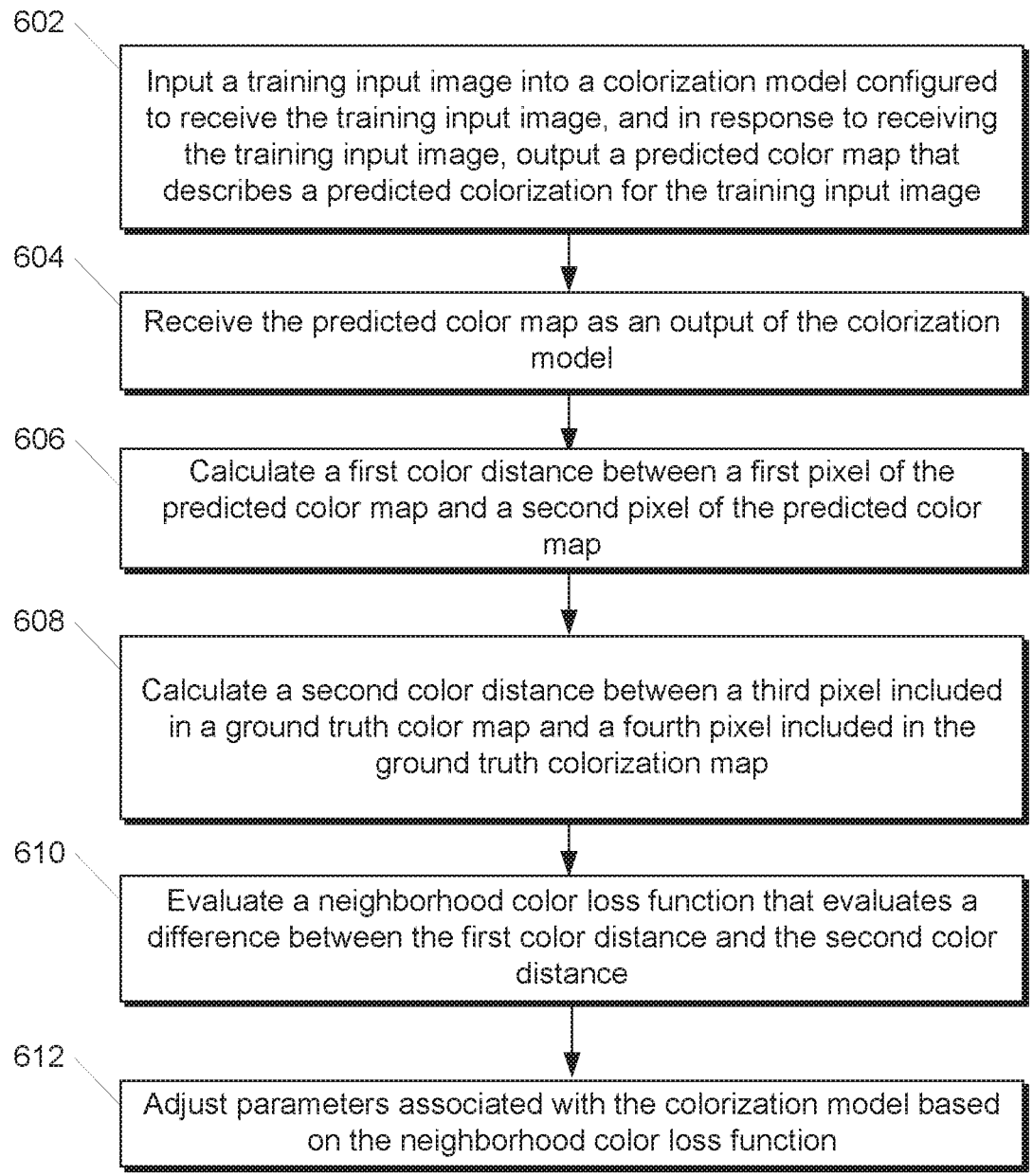
FIG. 6 depicts a flow chart diagram of an example method for training a colorization model according to example embodiments of the present disclosure.

FIG. 6 depicts a flow chart diagram of an example method 600 to perform according to example embodiments of the present disclosure. Although FIG. 6 depicts steps performed in a particular order for purposes of illustration and discussion, the methods 600 of the present disclosure are not limited to the particularly illustrated order or arrangement. The various steps of the method 600 can be omitted, rearranged, combined, and/or adapted in various ways without deviating from the scope of the present disclosure.

At 602, a computing system can input a training input image into a colorization model configured to receive the training input image, and in response to receiving the training input image, output a predicted color map that describes a predicted colorization for the training input image, for example as described above with reference to FIGS. 2 through 4.

At 604, the computing system can receive the predicted color map as an output of the colorization model, for example as described above with reference to FIGS. 2 through 4.

At 606, the computing system can calculate a first color distance between a first pixel of the predicted color map and a second pixel of the predicted color map, for example as described above with reference to FIGS. 2 through 4.

At 608, the computing system can calculate a second color distance between a third pixel included in a ground truth color map and a fourth pixel included in the ground truth colorization map, for example as described above with reference to FIGS. 2 through 4. The third pixel and fourth pixel included in the ground truth color map may spatially correspond, respectively, with the first pixel and second pixel included in the predicted color map.

At 610, the computing system can evaluate a neighborhood color loss function that evaluates a difference between the first color distance and the second color distance, for example as described above with reference to FIGS. 2 through 4.

At 612, the computing system can adjust parameters associated with the colorization model based on the neighborhood color loss function, for example as described above with reference to FIGS. 2 through 4.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for training an image colorization model, the method comprising:

inputting, by one or more computing devices, a training input image into a colorization model configured to receive the training input image and process the training input image to output a predicted color map that describes a predicted colorization for the training input image;

receiving, by the one or more computing devices, the predicted color map as an output of the colorization model;

calculating, by the one or more computing devices, a first color distance between a first pixel included in the predicted color map and a second pixel included in the predicted color map;

calculating, by the one or more computing devices, a second color distance between a third pixel included in a ground truth color map and a fourth pixel included in the ground truth color map, wherein the third pixel and fourth pixel included in the ground truth color map spatially correspond, respectively, with the first pixel and second pixel included in the predicted color map;

evaluating, by the one or more computing devices, a neighborhood color loss function that evaluates a difference between the first color distance and the second color distance;

iteratively evaluating, by the one or more computing devices, the neighborhood color loss function for a plurality of additional second pixels with respect to the first pixel to generate a neighborhood color loss map for the first pixel of the predicted color map; and adjusting, by the one or more computing devices, parameters associated with the colorization model based on the neighborhood color loss function.

2. The method of claim 1, further comprising randomly selecting, by the one or more computing devices, the first pixel of the predicted color map.

3. The method of claim 1, further comprising selecting, by the one or more computing devices, at least one of the first pixel or the second pixel based on at least one of:

a location of a detected feature within the training input image; or a predetermined pattern defined within the predicted color map.

4. The method of claim 1 further comprising iteratively generating, by the one or more computing devices, respective neighborhood color loss maps for respective additional first pixels of the predicted color map.

5. The method of claim 1, wherein:

the colorization model comprises a multinomial prediction model and a refinement model, wherein the multinomial prediction model is configured to receive the training input image, and in response to receiving the training input image, output a multinomial color distribution that describes a plurality of colorizations for the training input image in a discretized color space, and wherein the refinement model is configured to receive the multinomial color distribution, and in response to receiving the multinomial color distribution, output the predicted color map;

inputting the training input image into the colorization model comprises inputting the training input image into the multinomial prediction model; and the method further comprises:

receiving the multinomial color distribution as an output of the multinomial prediction model; and inputting the multinomial color distribution into the refinement model.

6. The method of claim 5, wherein adjusting the parameters associated with the colorization model based on the neighborhood color loss function comprises adjusting parameters of the refinement model.

7. The method of claim 5, further comprising:
encoding the predicted color map output by the refinement model into a discretized color space to generate a discretized predicted color map;
evaluating a refinement softmax loss function that describes a difference between the multinomial color distribution and the discretized predicted color map; and
adjusting parameters of the refinement model based on the refinement softmax loss function.

8. The method of claim 7, wherein encoding the predicted color map into the discretized color space to generate the discretized predicted color map comprises one-hot encoding respective color values of the predicted color map into respective ones of a plurality of color bins of the discretized color space.

9. The method of claim 7, wherein projecting the predicted color map into the discretized color space to generate the discretized predicted color map comprises soft-encoding the predicted color map with respect to a plurality of color bins of the discretized color space.

10. The method of claim 5, further comprising:
evaluating an absolute color loss function that describes a difference between the predicted color map and a ground truth color map; and
adjusting the parameters associated with the refinement model based on the absolute color loss function.

11. The method of claim 5, further comprising:
encoding the ground truth color map into a discretized color space that is associated with the ground truth color map, the discretized color space comprising a plurality of color bins to generate a discretized ground truth color map;
evaluating a multinomial softmax loss function that describes a difference between the discretized ground truth color map and the multinomial color distribution output by the multinomial prediction model; and
adjusting parameters of the multinomial prediction model based on the multinomial softmax loss function.

12. The method of claim 1, wherein the discretized color space comprises a CIELAB color space.

13. A computing system comprising:
one or more processors;
a colorization model configured to receive a training input image and, in response to receiving the training input image, output a predicted color map that describes a predicted colorization for the training input image;
one or more non-transitory computer-readable media that collectively store instructions that, when executed by the one or more processors, cause the computing system to perform operations, the operations comprising:
inputting the training input image into the colorization model;
receiving the predicted color map as an output of the colorization model;
calculating a first color distance between a first pixel included in the predicted color map and a second pixel included in the predicted color map;
calculating a second color distance between a third pixel included in a ground truth color map and a fourth pixel included in the ground truth color map, wherein the third pixel and fourth pixels included in the ground truth color map spatially correspond, respectively, with the first pixel and second pixel included in the predicted color map;
evaluating a neighborhood color loss function that evaluates a difference between the first color distance and the second color distance; and
adjusting parameters associated with the colorization model based on the neighborhood color loss function; and
iteratively generating respective neighborhood color loss maps for respective additional first pixels of the predicted color map.

14. The computing system of claim 13, wherein the operations further comprise randomly selecting the first pixel of the predicted color map.

15. The computing system of claim 13, wherein the operations further comprise selecting at least one of the first pixel or the second pixel based on at least one of:
a location of a detected feature within the training input image; or
a predetermined pattern defined within the predicted color map.

16. A method for training an image colorization model, the method comprising:
inputting, by one or more computing devices, a training input image into a colorization model configured to receive the training input image and process the training input image to output a predicted color map that describes a predicted colorization for the training input image;
receiving, by the one or more computing devices, the predicted color map as an output of the colorization model;
calculating, by the one or more computing devices, a first color distance between a first pixel included in the predicted color map and a second pixel included in the predicted color map;
calculating, by the one or more computing devices, a second color distance between a third pixel included in a ground truth color map and a fourth pixel included in the ground truth color map, wherein the third pixel and fourth pixel included in the ground truth color map spatially correspond, respectively, with the first pixel and second pixel included in the predicted color map;
evaluating, by the one or more computing devices, a neighborhood color loss function that evaluates a difference between the first color distance and the second color distance; and
adjusting, by the one or more computing devices, parameters associated with the colorization model based on the neighborhood color loss function;
wherein:
the colorization model comprises a multinomial prediction model and a refinement model, wherein the multinomial prediction model is configured to receive the training input image, and in response to receiving the training input image, output a multinomial color distribution that describes a plurality of colorizations for the training input image in a discretized color space, and wherein the refinement model is configured to receive the multinomial color distribution, and in response to receiving the multinomial color distribution, output the predicted color map;
inputting the training input image into the colorization model comprises inputting the training input image into the multinomial prediction model; and
the method further comprises:

receiving the multinomial color distribution as an output of the multinomial prediction model; and
inputting the multinomial color distribution into the refinement model.

\* \* \* \* \*